United States Patent
Yang et al.

(10) Patent No.: US 9,860,916 B2
(45) Date of Patent: Jan. 2, 2018

(54) DATA TRANSMISSION METHOD, ACCESS POINT AND STATION

(71) Applicant: Huawei Technologies Co., Ltd., Shenzhen, Guangdong (CN)

(72) Inventors: Lvxi Yang, Nanjing (CN); Yuan Sun, Nanjing (CN); Xun Yang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 611 days.

(21) Appl. No.: 14/465,593

(22) Filed: Aug. 21, 2014

(65) Prior Publication Data
US 2015/0016325 A1 Jan. 15, 2015

Related U.S. Application Data

(63) Continuation of application No. PCT/CN2013/071813, filed on Feb. 25, 2013.

(30) Foreign Application Priority Data

Feb. 23, 2012 (CN) .......................... 2012 1 0042431

(51) Int. Cl.
H04W 4/00 (2009.01)
H04W 74/06 (2009.01)
H04W 52/02 (2009.01)

(52) U.S. Cl.
CPC ....... *H04W 74/06* (2013.01); *H04W 52/0216* (2013.01); *H04W 52/0235* (2013.01); *Y02B 60/50* (2013.01)

(58) Field of Classification Search
CPC ......... H04W 52/0209; H04W 52/0235; H04W 74/06
See application file for complete search history.

(56) References Cited

U.S. PATENT DOCUMENTS

2005/0207400 A1 9/2005 Shinohara
2007/0037548 A1 2/2007 Sammour et al.
(Continued)

FOREIGN PATENT DOCUMENTS

CN 1976297 A 6/2007
CN 101300788 A 11/2008
(Continued)

OTHER PUBLICATIONS

Menzo Wentink, et al., "Low Power Medium Access", Sep. 2, 2011, 6 pages.
Yong Liu, et al., "Low Power Medium Access", Aug. 29, 2011, 7 pages.
"Part 11: Wireless LAN Medium Access Control (MAC) and Physical Layer (PHY) Specifications", IEEE Draft P802.11-REVmb/D12, Nov. 2011, 2910 pages.
(Continued)

*Primary Examiner* — Kevin C Harper

(57) ABSTRACT

A method includes: sending an indication frame to an access point AP, where the indication frame includes first indication information and second indication information, the first indication information is used to indicate that a type of the indication frame is a PS-POLL frame, and the second indication information is used to indicate duration of the indication frame; and sending a data frame to the AP within the duration indicated by the second indication information. An STA sends PS-POLL to an AP by using an indication frame and reserves channel duration, so that the STA does not need to contend for a channel again when the STA sends an uplink data frame to the AP after receiving a downlink data frame sent by the AP, which allows the STA to receive downlink data and send uplink data within one TXOPA.

20 Claims, 2 Drawing Sheets

100

An STA sends an indication frame to an AP, where the indication frame includes first indication information and second indication information, the first indication information is used to indicate that a type of the indication frame is a PS-POLL frame, and the second indication information is used to indicate duration of the indication frame — 110

The STA sends a data frame to the AP within the duration indicated by the second indication information — 120

(56) References Cited

U.S. PATENT DOCUMENTS

| | | |
|---|---|---|
| 2007/0058605 A1 | 3/2007 | Meylan et al. |
| 2007/0104201 A1* | 5/2007 | Wentink ................ H04W 74/06 370/392 |
| 2007/0115905 A1 | 5/2007 | Jokela et al. |
| 2007/0153830 A1* | 7/2007 | Xhafa .................... H04W 28/06 370/470 |
| 2007/0201468 A1 | 8/2007 | Jokela |
| 2007/0237104 A1* | 10/2007 | Alon ................. H04W 52/0216 370/311 |
| 2008/0045153 A1 | 2/2008 | Surineni et al. |
| 2008/0219228 A1 | 9/2008 | Seok et al. |
| 2009/0092039 A1* | 4/2009 | Niu .................... H04L 27/2613 370/208 |
| 2014/0307602 A1* | 10/2014 | Seok ................ H04W 52/0216 370/311 |
| 2014/0321349 A1* | 10/2014 | Seok .................... H04W 74/08 370/311 |

FOREIGN PATENT DOCUMENTS

| | | |
|---|---|---|
| CN | 101395835 A | 3/2009 |
| JP | 2005268890 A | 9/2005 |
| JP | 2005277647 A | 10/2005 |
| JP | 2009540688 A | 11/2009 |
| JP | 2013522968 A | 6/2013 |
| WO | WO 2008/111826 A1 | 9/2008 |
| WO | WO 2011/112741 A1 | 9/2011 |

OTHER PUBLICATIONS

"Part 11: Wireless LAN Medium Access Control (MAC) and Physical Layer (PHY) Specifications: Amendment 4: Enhancements for Higher Throughput", IEEE Draft P802.11n/D3.00, Sep. 2007, 544 pages.

* cited by examiner

100

An STA sends an indication frame to an AP, where the indication frame includes first indication information and second indication information, the first indication information is used to indicate that a type of the indication frame is a PS-POLL frame, and the second indication information is used to indicate duration of the indication frame ~110

The STA sends a data frame to the AP within the duration indicated by the second indication information ~120

Receive an indication frame sent by an STA, where the indication frame includes first indication information and second indication information, the first indication information is used to indicate that a type of the indication frame is a PS-POLL frame, and the second indication information is used to indicate duration of the indication frame /210

Receive a data frame sent by the STA within the duration indicated by the second indication information /220

FIG. 2

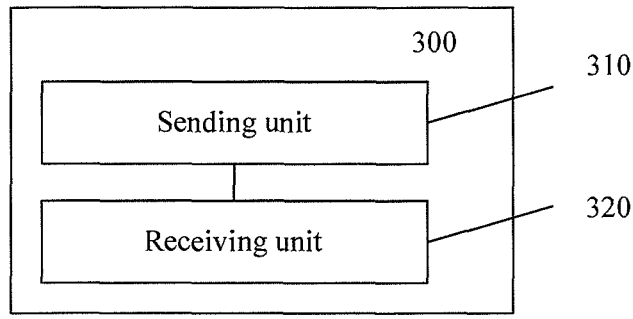

FIG. 3

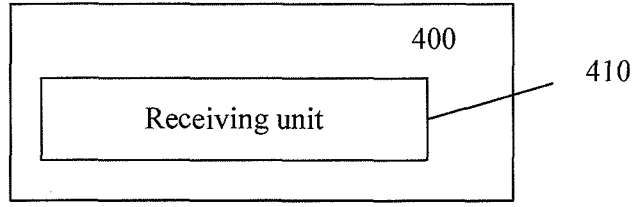

FIG. 4

DATA TRANSMISSION METHOD, ACCESS POINT AND STATION

CROSS-REFERENCE TO RELATED APPLICATIONS

This application is a continuation of International Application No. PCT/CN2013/071813, filed on Feb. 25, 2013, which claims priority to Chinese Patent Application No. 201210042431.5, filed on Feb. 23, 2012, both of which are hereby incorporated by reference in their entireties.

TECHNICAL FIELD

Embodiments of the present invention relate to the field of wireless communications, and in particular, to a data transmission method, an access point, and a station.

BACKGROUND

In a wireless local area network (Wireless Local Area Network, WLAN for short) system, a station (Station, STA for short) with a high energy saving requirement, for example, a sensor station, may exist. In a standard, a power saving (Power Saving, PS for short) mode of an STA is defined. An STA selecting the PS mode may sleep for one or more beacon (beacon) intervals. When an access point (Access Point, AP for short) caches data of the STA, the access point notifies the STA by using a beacon. The STA may request to obtain the cached data from the AP by using a power saving polling (Power Saving Polling, PS-POLL for short) frame. A level of the PS-POLL frame is Access Category-Best Effort (Access Category-Best Effort, AC-BE for short), and a corresponding transmission opportunity (Transmission Opportunity, TXOP for short) is zero, that is, only one data frame is allowed to be transmitted. If the STA intends to send uplink data to the AP after receiving downlink data sent by the AP, channel contention needs to be performed again to establish a new TXOP, thereby causing resource waste for the STA with a high energy saving requirement.

SUMMARY

An embodiment of the present invention provides a data transmission method, which allows an STA to receive downlink data and send uplink data within one TXOP, thereby reducing resources consumed when the STA contends for a channel and improving an energy utilization rate of the STA.

According to one aspect, a data transmission method is provided, where the method includes:

sending an indication frame to an access point AP, where the indication frame includes first indication information and second indication information, the first indication information is used to indicate that a type of the indication frame is a power saving polling PS-POLL frame, and the second indication information is used to indicate a duration of a reserved channel; and sending a data frame to the AP within the duration indicated by the second indication information.

According to another aspect, a method for receiving an indication frame sent by the STA is provided, where the indication frame includes first indication information and second indication information, the first indication information is used to indicate that a type of the indication frame is a PS-POLL frame, and the second indication information is used to indicate a duration of a reserved channel; and a data frame sent by the STA is received within the duration indicated by the second indication information.

According to another aspect, a station is provided, where the station includes:

a sending unit, configured to send an indication frame to an AP, where the indication frame includes first indication information and second indication information, the first indication information is used to indicate that a type of the indication frame is a PS-POLL frame, and the second indication information is used to indicate a duration of a reserved channel; and a receiving unit, configured to send a data frame from an STA to the AP within the duration indicated by the second indication information.

According to another aspect, an access point is provided, where the access point includes:

a receiving unit, configured to receive an indication frame sent by an STA, where the indication frame includes first indication information and second indication information, the first indication information is used to indicate that a type of the indication frame is a power saving polling PS-POLL frame, and the second indication information is used to indicate a duration of a reserved channel; and the receiving unit is further configured to receive a data frame sent by the STA within the duration indicated by the second indication information.

According to the embodiments of the present invention, by using an indication frame, an STA sends PS-POLL to an AP, as well as reserves a channel duration, so that the STA does not need to contend for a channel again when the STA sends an uplink data frame to the AP after receiving a downlink data frame sent by the AP, which allows the STA to receive downlink data and send uplink data within one TXOP, thereby reducing resources consumed when the STA contends for a channel and improving an energy utilization rate of the STA.

BRIEF DESCRIPTION OF THE DRAWINGS

FIG. 1 is a schematic flowchart of a data transmission method according to an embodiment of the present invention;

FIG. 2 is a schematic flowchart of a data transmission method according to an embodiment of the present invention;

FIG. 3 is a schematic structural diagram of a station according to an embodiment of the present invention; and FIG. 4 is a schematic structural diagram of an access point according to an embodiment of the present invention.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention.

FIG. 1 is a schematic flowchart of a data transmission method 100 according to an embodiment of the present invention. The method may be applied to a wireless local area network, for example, data transmission between an access point AP and a user station STA. As shown in FIG. 1, the method 100 includes:

110: An STA sends an indication frame to an AP, where the indication frame includes first indication information and second indication information, the first indication information is used to indicate that a type of the indication frame is a power saving polling PS-POLL frame, and the second indication information is used to indicate duration of the indication frame.

120: The STA sends a data frame to the AP within the duration indicated by the second indication information.

The following further describes an implementation process of the method provided in the embodiment of the present invention in detail with reference to specific examples.

In a WLAN, if an AP caches data of an STA, the AP notifies the STA by using a beacon (Beacon) frame. After receiving the beacon frame, the STA can request the data from the AP according to a solution of the embodiment of the present invention.

According to the embodiment of the present invention, in step 110, the indication frame sent by the STA to the AP may be an enhanced PS-POLL frame of a Media Access Control (Media Access Control, MAC for short) layer, where the enhanced PS-POLL frame includes a duration (Duration) field. In this case, the first indication information can be carried in a frame control (Frame Control) field of the enhanced PS-POLL frame, and the second indication information can be carried in the Duration field. For example, a TXOP time limit indicated by the second indication information in the Duration field is, for example, 3.008 ms or 1.504 ms.

After receiving the enhanced PS-POLL frame, another STA correspondingly sets a network allocation vector (Network Allocation Vector, NAV for short) of the another STA according to the Duration field, so as to allow the STA that sends the PS-POLL to receive downlink data from the AP and send uplink data to the AP within the TXOP time limit.

In this case, if the AP can send the cached data to the STA, the AP sends the data to the STA after short inter-frame space (Short Inter-Frame Space, SIFS for short) time; and if the AP cannot send the cached data to the STA, the AP sends an acknowledgement (Acknowledgement, ACK for short) frame to the STA after SIFS time. No matter whether the STA receives the downlink data or the ACK frame sent by the AP, the STA can send uplink data to the AP within the TXOP time limit indicated by the second indication information, that is, implement step 120 without contending for a channel again.

According to the embodiment of the present invention, in step 110, the indication frame sent by the STA to the AP may also be a control frame of a MAC layer, where the control frame may be a control wrapper (Control Wrapper) frame, a carried frame control (Carried Frame Control) field of the control wrapper frame carries the first information, which is used to indicate that the control wrapper frame is used as a PS-POLL frame, and the second information is carried in a duration/ID (Duration/ID) field of the control wrapper frame. For example, the TXOP time limit indicated by the second indication information in the Duration/ID field is, for example, 3.008 ms or 1.504 ms. A person skilled in the art can understand that another field in the control wrapper frame may be set according to a technical requirement or a requirement of the STA.

As described above, after receiving the control wrapper frame, another STA correspondingly sets a network allocation vector (Network Allocation Vector, NAV for short) of the another STA according to the second indication information in the Duration/ID field, so as to allow the STA that sends the control wrapper frame to receive downlink data from the AP and send uplink data to the AP within the TXOP time limit.

According to another alternative solution of the embodiment of the present invention, in step 110, the indication frame sent by the STA to AP may also be a pure physical layer data frame without a MAC frame header, for example, a null data packet (Null Data Packet, NDP for short). Generally, an NDP includes a short training field (Short Training Field, STE), a long training field 1 (Long Training Field 1, LTF1 for short), and a signal field (Signal Field, SIG for short). According to the embodiment of the present invention, the first information and the second information can be carried in the SIG field, where the first information indicates that the NDP is used as a PS-POLL frame, and the second information indicates a duration/a length of a channel reserved by the PS-POLL frame. For example, the TXOP time limit indicated by the second indication information in the SIG field is, for example, 3.008 ms or 1.504 ms. In addition, a person skilled in the art can understand that the SIG field may further carry an address of the AP and an address of the STA that sends the NDP.

According to the embodiment of the present invention, the indication frame may include a quality of service (Quality of Service, QoS for short) control field, where a QoS level of the indication frame that is carried in the QoS control field is an access category_video (Access Category_Video, AC_VI for short) level or an access category_voice (Access Category_Voice, AC_VO for short) level, a TXOP time limit is 3.008 ms under the AC_VI level, and the TXOP time limit is 1.504 ms under the AC_VO level.

The foregoing describes the solutions of the embodiments of the present invention from a perspective of an STA. Correspondingly, from a perspective of an AP, as shown in FIG. 2, a data transmission method 200 provided in an embodiment of the present invention includes:

210: Receive an indication frame sent by the STA, where the indication frame includes first indication information and second indication information, the first indication information is used to indicate that a type of the indication frame is a power saving polling PS-POLL frame, and the second indication information is used to indicate duration of the indication frame.

220: Receive a data frame sent by the STA within the duration indicated by the second indication information.

According the foregoing content, the indication frame is an enhanced PS-POLL frame of a MAC layer, where the enhanced PS-POLL frame carries the first indication information in a frame control field, and the enhanced PS-POLL frame includes a duration field, and carries the second indication information in the duration field.

According to the foregoing content, the indication frame is a control frame of the MAC layer, where the control frame is a control wrapper frame, and the control wrapper frame carries the first indication information in a carried frame control Carried Frame Control field, and carries the second indication information in a duration/ID Duration/ID field.

According to the foregoing content, the indication frame is an NDP, where the NDP carries the first indication information and the second indication information in a signal field.

According to the foregoing content, the indication frame may include a QoS control field, where a QoS level of the indication frame that is carried in the QoS control field is an AC_VI level or an AC_VO level, a TXOP time limit is 3.008 ms under the AC_VI level, and the TXOP time limit is 1.504 ms under the AC_VO level.

According to the embodiment of the present invention, an STA sends PS-POLL to an AP by using an indication frame and reserves channel duration, so that the STA does not need to contend for a channel again when the STA sends an uplink data frame to the AP after receiving a downlink data frame sent by the AP, which allows the STA to receive downlink data and send uplink data within one TXOP, thereby reducing resources consumed when the STA contends for a channel and improving an energy utilization rate of the STA.

The embodiments of the present invention further provide an AP and an STA for implementing the data transmission method in the embodiments of the present invention, which are separately described below.

FIG. 3 is a schematic structural diagram of a station according to an embodiment of the present invention. As shown in FIG. 3, a station 300 according to the embodiment of the present invention includes:

a sending unit 310, configured to send an indication frame to an AP, where the indication frame includes first indication information and second indication information, the first indication information is used to indicate that a type of the indication frame is a power saving polling PS-POLL frame, and the second indication information is used to indicate duration of the indication frame; and a receiving unit 320, configured to send a data frame from an STA to the AP within the duration indicated by the second indication information.

According to the embodiment of the present invention, the indication frame sent by the sending unit 310 is an enhanced PS-POLL frame of a MAC layer, where the enhanced PS-POLL frame carries the first indication information in a frame control field, and the enhanced PS-POLL frame includes a duration field, and carries the second indication information in the duration field.

According to the embodiment of the present invention, the indication frame sent by the sending unit 310 is a control frame of the MAC layer, where the control frame is a control wrapper frame, and the control wrapper frame carries the first indication information in a Carried Frame Control field, and carries the second indication information in a Duration/ID field.

According to the embodiment of the present invention, the indication frame sent by the sending unit 310 is an NDP, where the NDP carries the first indication information and the second indication information in a signal field.

According to the embodiment of the present invention, the indication frame sent by the sending unit 310 may include a QoS control field, where a QoS level of the indication frame that is carried in the QoS control field is an AC_VI level or an AC_VO level, a TXOP time limit is 3.008 ms under the AC_VI level, and the TXOP time limit is 1.504 ms under the AC_VO level.

FIG. 4 is a schematic structural diagram of an access point 400 according to an embodiment of the present invention. The access point may be an access point in a WLAN system. As shown in FIG. 4, the access point 400 includes:

a receiving unit 410, configured to receive an indication frame sent by the STA, where the indication frame includes first indication information and second indication information, the first indication information is used to indicate that a type of the indication frame is a PS-POLL frame, and the second indication information is used to indicate duration of the indication frame; and the receiving unit 410 is further configured to receive a data frame sent by the STA within the duration indicated by the second indication information.

According to the embodiment of the present invention, the indication frame received by the receiving unit 410 is an enhanced PS-POLL frame of a MAC layer, where the enhanced PS-POLL frame carries the first indication information in a frame control field, and the enhanced PS-POLL frame includes a duration field, and carries the second indication information in the duration field.

According to the embodiment of the present invention, the indication frame received by the receiving unit 410 is a control frame of the MAC layer, where the control frame is a control wrapper frame, and the control wrapper frame carries the first indication information in a Carried Frame Control field, and carries the second indication information in a Duration/ID field.

According to the embodiment of the present invention, the indication frame received by the receiving unit 410 is an NDP, where the NDP carries the first indication information and the second indication information in a signal field.

According to the embodiment of the present invention, the indication frame received by the receiving unit 410 may include a QoS control field, where a QoS level of the indication frame that is carried in the QoS control field is an AC_VI level or an AC_VO level, a TXOP time limit is 3.008 ms under the AC_VI level, and the TXOP time limit is 1.504 ms under the AC_VO level.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person skilled in the art may clearly understand that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit dividing is merely logical function dividing, and there may be other dividing manners in actual implementation. For example, a plurality of units or components may be combined or integrated into another system, or some features may be ignored or not performed. In addition, the shown or discussed mutual couplings or direct couplings or communication connections may be implemented by using some interfaces. The indirect couplings or communication connections between the apparatuses or units may be electrical, mechanical, or in another form.

The units described as separate parts may or may not be physically separated, and parts shown as units may or may not be physical units, that is, may be located in one position, or may also be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more than two units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The software product is stored in a storage medium, and includes several instructions for instructing a computer device (which may be a personal computer, a server, a network device, or the like) to perform all or a part of the steps of the methods described in the embodiments of the present invention. The storage medium includes any medium that can store program code, such as a USE flash drive, a removable hard disk, a read-only memory (ROM, Read-Only Memory), a random access memory (RAM, Random Access Memory), a magnetic disk, or an optical disc.

What is claimed is:

1. A data transmission method, comprising:
   sending an indication frame to an access point (AP), wherein the indication frame comprises first indication information and second indication information, the first indication information is used to indicate that a type of the indication frame is a power saving polling (PS-POLL) frame, and the second indication information is used to indicate a duration of a reserved channel; and
   sending a data frame to the AP within the duration indicated by the second indication information.

2. The method according to claim 1, wherein:
   the indication frame is an enhanced power saving polling (PS-POLL) frame of a Media Access Control MAC layer, the enhanced PS-POLL frame carries the first indication information in a frame control field and carries the second indication information in a duration field.

3. The method according to claim 1, wherein:
   the indication frame is a control frame of a Media Access Control MAC layer, the control frame is a control wrapper frame, and the control wrapper frame carries the first indication information in a carried frame control field and carries the second indication information in a duration/ID field.

4. The method according to claim 1, wherein:
   the indication frame is a null data packet, the null data packet carries the first indication information and the second indication information in a signal field.

5. The method according to claim 1, wherein the indication frame comprises a quality of service control field, and a quality of service level of the indication frame that is carried in the quality of service control field is an access category_video AC_VI level or an access category_voice AC_VO level.

6. A data transmission method, comprising:
   receiving an indication frame sent by a station (STA), wherein the indication frame comprises first indication information and second indication information, the first indication information is used to indicate that a type of the indication frame is a power saving polling (PS-POLL) frame, and the second indication information is used to indicate a duration of a reserved channel; and
   receiving a data frame sent by the STA within the duration indicated by the second indication information.

7. The method according to claim 6, wherein:
   the indication frame is an enhanced PS-POLL frame of a Media Access Control MAC layer, the enhanced PS-POLL frame carries the first indication information in a frame control field and carries the second indication information in a duration field.

8. The method according to claim 6, wherein:
   the indication frame is a control frame of a MAC layer, the control frame is a control wrapper frame, and the control wrapper frame carries the first indication information in a carried frame control field and carries the second indication information in a duration/ID field.

9. The method according to claim 6, wherein:
   the indication frame is a null data packet, the null data packet carries the first indication information and the second indication information in a signal field.

10. The method according to claim 6, wherein the indication frame comprises a quality of service control field, and a quality of service level of the indication frame that is carried in the quality of service control field is an AC_VI level or an AC_VO level.

11. A station (STA), comprising:
    a processor; and
    a memory in communication with the processor, wherein the processor is configured to:
      send an indication frame to an access point (AP), wherein the indication frame comprises first indication information and second indication information, the first indication information is used to indicate that a type of the indication frame is a power saving polling (PS-POLL) frame, and the second indication information is used to indicate a duration of a reserved channel; and
      send a data frame from the STA to the AP within the duration indicated by the second indication information.

12. The station according to claim 11, wherein:
    the indication frame is an enhanced PS-POLL frame of a MAC layer, the enhanced PS-POLL frame carries the first indication information in a frame control field and carries the second indication information in a duration field.

13. The station according to claim 11, wherein:
    the indication frame is a control frame of a MAC layer, the control frame is a control wrapper frame, and the control wrapper frame carries the first indication information in a carried frame control field, and carries the second indication information in a duration/ID field.

14. The station according to claim 11, wherein:
    the indication frame is a null data packet (NDP), the NDP carries the first indication information and the second indication information in a signal field.

15. The station according to claim 11, wherein:
    the indication frame comprises a quality of service control field, wherein a quality of service level of the indication frame that is carried in the quality of service control field is an AC_VI level or an AC_VO level.

16. An access point, comprising:
    a processor; and
    a memory in communication with the processor, wherein the processor is configured to:
      receive an indication frame sent by a station (STA), wherein the indication frame comprises first indication information and second indication information, the first indication information is used to indicate that a type of the indication frame is a power saving polling (PS-POLL) frame, and the second indication information is used to indicate a duration of a reserved channel; and
      receive a data frame sent by the STA within the duration indicated by the second indication information.

17. The access point according to claim 16, wherein:
the indication frame is an enhanced PS-POLL frame of a MAC layer, the enhanced PS-POLL frame carries the first indication information in a frame control field and carries the second indication information in a duration field.

18. The access point according to claim 16, wherein:
the indication frame is a control frame of a MAC layer, the control frame is a control wrapper frame, and the control wrapper frame carries the first indication information in a carried frame control field, and carries the second indication information in a duration/ID field.

19. The access point according to claim 16, wherein:
the indication frame is a null data packet (NDP), the NDP carries the first indication information and the second indication information in a signal field.

20. The access point according to claim 16, wherein:
the indication frame comprises a quality of service control field, wherein a quality of service level of the indication frame that is carried in the quality of service control field is an AC_VI level or an AC_VO level.

* * * * *